Dec. 23, 1930.  L. BATCHELOR  1,785,926
SEED PLANTER
Filed July 8, 1929  3 Sheets-Sheet 3
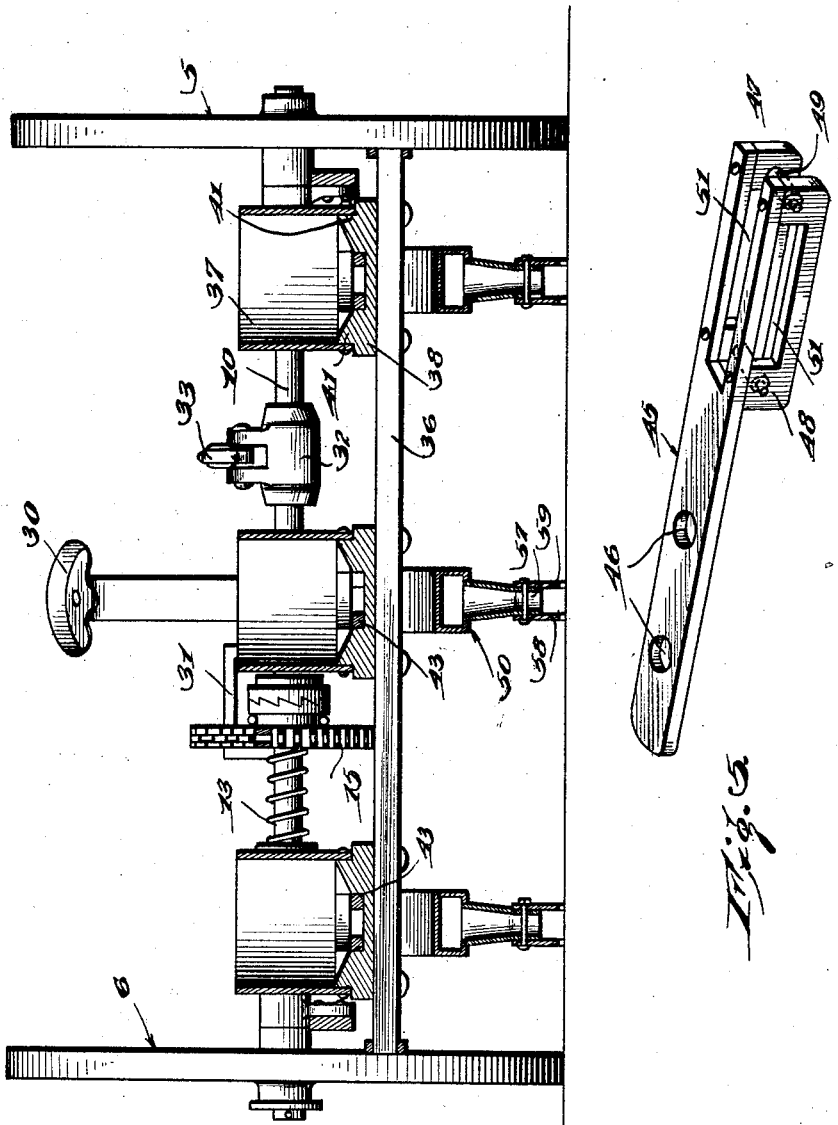
INVENTOR
Landon Batchelor,
BY
ATTORNEY Patented Dec. 23, 1930

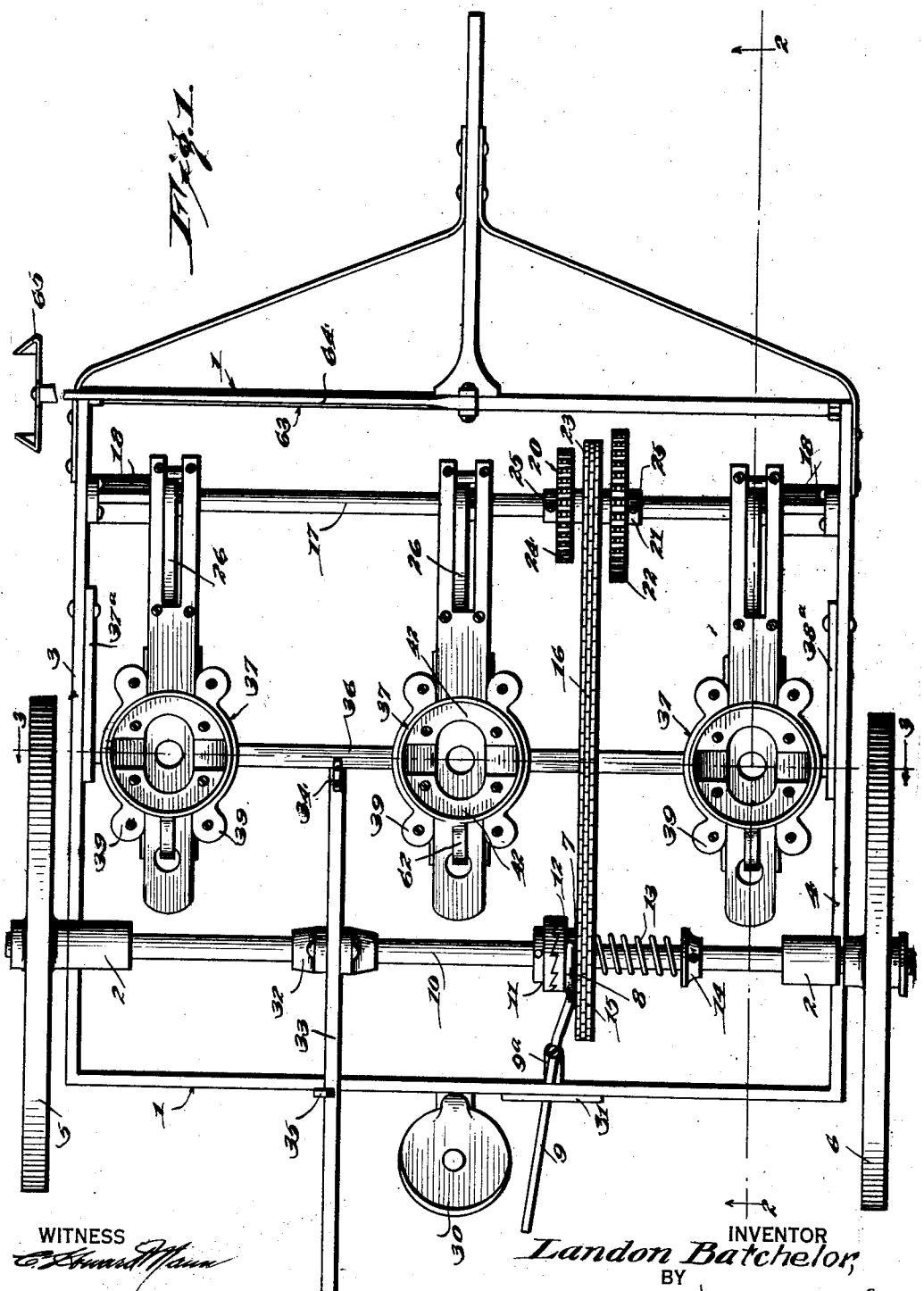

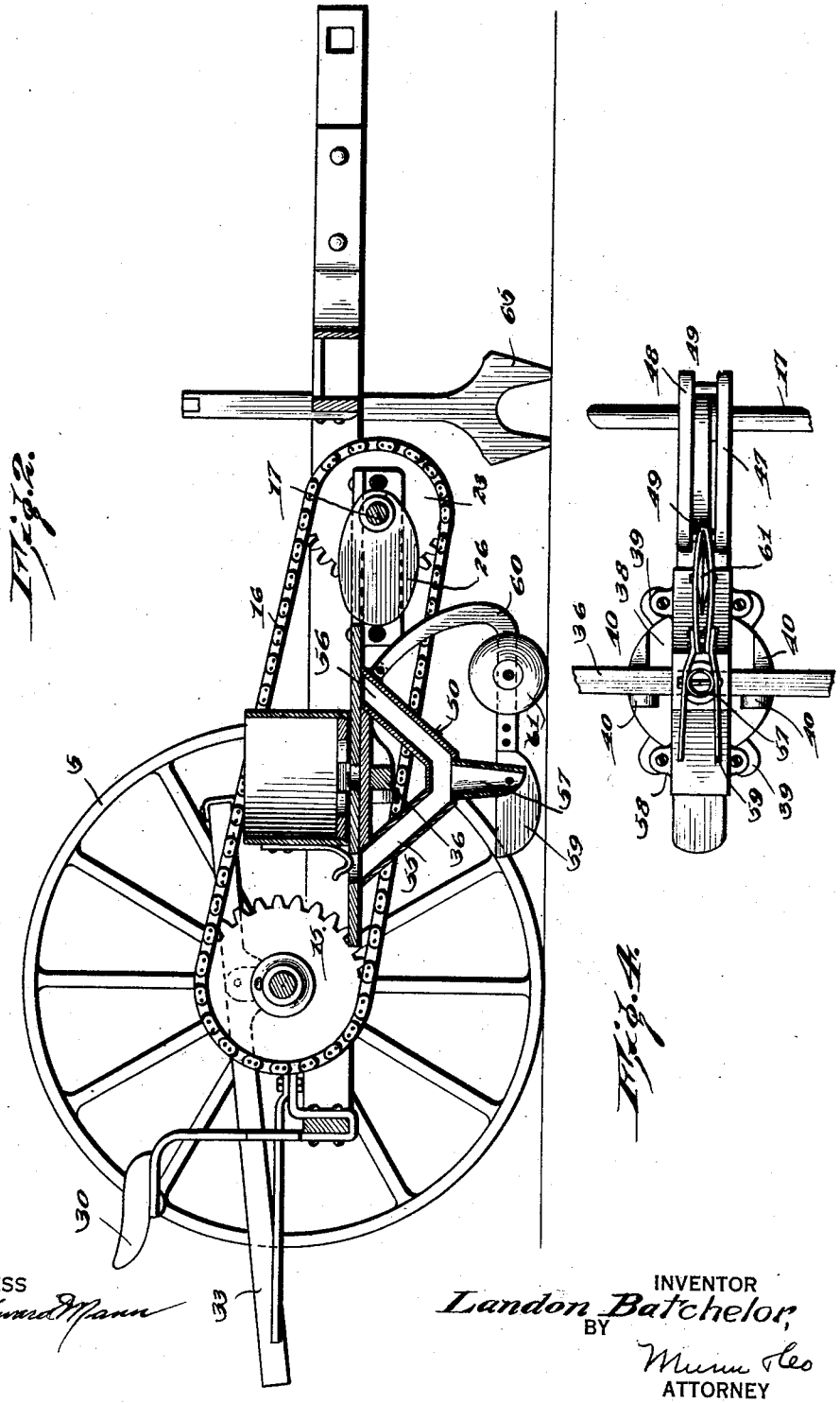

1,785,926

UNITED STATES PATENT OFFICE

LANDON BATCHELOR, OF LAWRENCEBURG, INDIANA

SEED PLANTER

Application filed July 8, 1929. Serial No. 376,787.

This invention relates to planters for various kinds of seed.

A primary object of the invention is to provide a seed planter the dropping mechanism of which is operatively connected with the traction wheels and adapted to be controlled by the turning of said wheels for advancing or retarding the dropping mechanism.

Another object of the invention is to generally simplify and improve the construction and increase the practical efficiency of planters of this class.

Still another object of the invention is to provide a checking device to indicate where the next row is to be located in order that the operator may observe the marks and thereby gain an idea as to whether the timing device should be operated to retard or advance the operation or dropping mechanism.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a top plan view of the planter constructed in accordance with this invention;

Fig. 2 is a longitudinal section on the line 2—2 of Fig. 1;

Fig. 3 is a transverse section taken on the line 3—3 of Fig. 1;

Fig. 4 is a detailed bottom plan view of the dropping mechanism; and

Fig. 5 is a detailed perspective view of the slide for controlling the dropping of the seed.

In the embodiment illustrated the frame 1 of this machine is shown rectangular in form provided with bearings 2 on each of the side bars 3 and 4 thereof near the rear end and which are designed to support an axle 10 which projects at its ends through said bearings beyond the side members 3 and 4 and has mounted thereon the traction wheels 5 and 6 the wheel 5 being shown fixed to the axle while the wheel 6 is mounted to rotate thereon.

A clutch mechanism for throwing into and out of operation the seed dropping mechanism is mounted on the axle 10 and comprises a member 11 which is fixed to the axle, the cooperating member 12 of the clutch being mounted to slide on the axle and held yieldably engaged with the member 11 by means of a coiled spring 13 located between a collar 14 fixed to the axle and the hub of the member 12. A sprocket wheel 15 is also fixed to the hub of the member 12 and has trained around it a sprocket chain 16 which is designed also to be trained around one of a series of sprocket wheels mounted on a shaft 17 located near the front portion of the frame 1. A series of gears 20 or sprocket wheels carried by the shaft 17 are fixedly secured to a sleeve or hub 21 mounted to slide on said shaft and held in adjusted position by means of set screws 25. Fixed to this hub 21 are sprocket gears 22, 23 and 24 of graduated sizes to receive chain 16. The sleeve 21 is adjustably mounted on the shaft 17 to adapt the desired gear to be positioned opposite the cooperating gear 15 so that the chain 16 may be properly engaged therewith. The shaft 17 is shown journalled in bearings 18 mounted on the inner faces of the side bars 3 and 4 of the frame 1 and in addition to carrying the group of sprocket gears 20 a plurality of cams 26 are fixedly secured to the shaft, in longitudinally spaced relation, three being here shown. It is of course understood that the number of cams will be varied according to the number of feed hoppers to be used on the planter.

The hub of the clutch member 12 is provided with the usual annular groove 7 with which is engaged the bifurcations or arms 8 of the clutch actuating lever 9 which is fulcrumed on a suitable bracket 9a on the rear member of the frame 1 and has its rear end positioned in convenient relation to the seat 30 designed to carry the planter operator. A rack carrying member 31 is carried by the rear frame member and is designed to be releasably engaged by the lever 9 for holding the latter in adjusted position.

A lever carrying sleeve 32 is rotatably mounted on the shaft 10 and has fulcrumed thereon between suitable lugs a lever 33 which extends longitudinally of the frame 1 and is provided at its front end with a catch 34 for a purpose presently to be described. This lever 33 is also adapted to be held in adjusted position by means of a latch member 35 mounted on the rear member of frame 1 shown clearly in Fig. 1.

A transverse bar 36 is carried by links 37a and 38a pivotally mounted on the side bars 3 and 4 of the frame.

Fixedly mounted on the cross bar 36 are a plurality of seed hoppers 37 any desired number of which may be used, three being here shown and which are arranged on the bar 36 opposite the cams 26 carried by shaft 17. These hoppers 37 may be of any desired configuration being here shown cylindrical and each includes a bottom plate 38 having a plurality of ears 39. This bottom plate 38 is also provided on its lower face with two pairs of depending lugs 40 adapted to straddle the bar 36 by means of which the plate is attached to the bar.

Extending upwardly from the upper face of the plate 38 are oppositely disposed shoulders or lugs 41 arranged to fit snugly within the hopper 37 and between these shoulders 41 are two semi-circular or arcuate plates 42 which are designed to fit within the cylinder or hopper 37 and to abut at their ends the lugs or shoulders 41. The hopper proper 37 is screwed or otherwise fixedly secured to these shoulders and under said hopper between the opposed faces of the shoulders is a slide-way 43 which extends transversely of the hopper and is designed to have slidably mounted therein a drill slide 45. This drill slide 45 is made in the form of an elongated plate having longitudinally spaced openings 46 therein designed to pass under the hopper and alternately over the seed discharge spout 50 hereinafter more fully described. The slide 45 carries at one end depending laterally spaced hangers 47 and 48 with rollers 49 arranged transversely between them at their opposite ends. These hangers 47 and 48 are slotted longitudinally as shown at 51 for the passage therethrough of the shaft 17 which carries the cams 26, the cams being designed to be arranged between the hangers 47 and 48 and the rollers 49 with the peripheries engaging the rollers.

Arranged below each hopper is a bifurcated discharge spout 50 made Y-shaped in form with the two arms 55 and 56 thereof diverging and located at their upper ends on opposite sides of a hopper 37 in the path of the slide 45, so that when said slide is reciprocated the openings 46 therein will alternately register with the hopper and the arms of the discharge spout, one opening discharging it to one arm and one into the other. From these arms the seed passes down through the body portion 57 of the spout and discharges between two shoes or runners 58 and 59 carried by an L-shaped standard 60 which also supports a revolving furrow opener 61 located in front of the shoes 58 and 59 so that the furrow will be opened to receive seed dropped from the spout 57 and be covered by shoes 58 and 59.

A spring 62 is carried by the hopper 37 and yieldably engages the slide 45 to insure a smooth even movement of the slide and prevent its wabbling.

A row marker 63 is shown mounted on the front bar of the frame 1 and extends laterally beyond the side of the frame being provided at one end of the bar 64 constituting a part thereof with a depending bifurcated marking element 65.

In the use of this planter the hoppers 37 are supported by the shaft carrying the cams and by the furrow opening wheels. If desired, for any reason, to lift the wheels which support the hoppers from engagement with the ground the lever 33 has the catch 34 thereof engaged with the hopper supporting bar 36 and the driver or operator by swinging the lever upwardly will lift the hoppers and supports connected therewith from out of engagement with the ground and it may be held in this position by engaging therewith the latch 35. This is particularly desirable when turning corners or when transporting the planter from one field to another.

When the planter is to be used the hoppers are positioned as shown in Figs. 2 and 3 with the furrow openers 61 engaging the ground. The clutch lever is then operated to throw the clutch members into engagement and permit the sprocket chain to impart motion from the axle driven by the traction wheels to shaft 17 which carries the cams. This rotation of shaft 17 causes the cams 26 to revolve and operate the seed dropping slides 45 which are reciprocated by the cams and bring the openings therein alternately into registration with the seed hoppers and with the discharge spout so that the seed is dropped at predetermined intervals into the furrow formed by the openers 61 and is covered by the shoes 58 and 59.

It is understood that the spacing of the seed apart in the drill is controlled by the rotation of the cam shaft and this is provided for by the group of gear wheels 20 carried thereby so that the driving chain may be engaged with anyone of these gears according to the distance apart in the drill it is desired that the seed shall be dropped.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. In a seed planter an axle, wheels on said axle, a frame supported by said axle, a cam carrying shaft mounted to rotate in said frame, a driving connection between the axle and said shaft, a seed hopper having a slide way in its under surface, a discharge spout located beneath said hopper, a seed drop slide mounted to travel in said slide way, and comprising a plate having apertures to alternately register with the hopper and the discharge spout, said plate having longitudinally slotted brackets for the passage therethrough of the cam shaft and a bifurcated portion to receive a cam, with rollers at the ends of said portion against which the periphery of the cam engages to reciprocate the drop slide on the revolving of the wheels.

2. In a seed planter the combination with an axle, a driving shaft provided with cams, a gear connection between the axle and the drive shaft, a seed hopper having a slide way in its under surface and a seed drop slide mounted to travel in said slide way, said slide comprising a plate having openings positioned to pass alternately under and out from under said hopper to receive and discharge the seed, laterally spaced hangers depending from one end of said plate to receive the drive shaft, said hangers being laterally spaced and provided at their ends with rollers to engage between them a cam on the drive shaft whereby the rotation of the axle will be imparted to the drive shaft and through said cam reciprocate the seed slide.

3. In a seed planter the combination with an axle, a driving shaft provided with cams, a gear connection between the axle and the drive shaft, a seed hopper having a slide way in its under surface and a seed drop slide mounted to travel in said slide way, said slide comprising a plate having openings positioned to pass alternately under and out from under said hopper to receive and discharge the seed, laterally spaced hangers depending from one end of said plate to receive the drive shaft, said hangers being laterally spaced and provided at their ends with rollers to engage between them a cam on the drive shaft whereby the rotation of the axle will be imparted to the drive shaft and through said cam reciprocate the seed slide, a right angular arm located below said seed slide, a furrow opener carried by said arm, laterally spaced shoes carried by said arm in the rear of said opener, and a discharge spout located between said shoes and having its upper end positioned to receive the seed from the slide.

4. In a seed planter, an axle, wheels on said axle, a frame supported by said axle, a cam carrying shaft mounted to rotate in the frame, a seed hopper carrying bar mounted to swing vertically in said frame, each seed hopper having a slide way in its under face, seed drop slides mounted on said cam shaft and slidable in said slide ways of the hoppers, said cams and slides being connected whereby the slides are reciprocated by the cams on the rotation of the cam shaft, said slides having openings which pass under and beyond the seed hoppers on the reciprocation of the slides whereby the seed are received therein and delivered, a driving connection between the axle and the cam shaft, and means for holding the seed hoppers in raised position.

5. In a seed planter, an axle, wheels on said axle, a frame supported by said axle, a cam carrying shaft mounted to rotate in the frame, a seed hopper carrying bar mounted to swing vertically in said frame, each seed hopper having a slide way in its under face, seed drop slides mounted on said cam shaft and slidable in said slide ways of the hoppers, said cams and slides being connected whereby the slides are reciprocated by the cams on the rotation of the cam shaft, said slides having openings which pass under and beyond the seed hoppers on the reciprocation of the slides whereby the seed are received therein and delivered, a driving connection between the axle and the cam shaft, and a lever for detachable engagement with the hopper carrying bar to elevate and hold the hoppers in raised position when desired.

6. In a seed planter, an axle, wheels on said axle, a frame supported by said axle, a cam carrying shaft mounted to rotate in the frame, a seed hopper carrying bar mounted to swing vertically in said frame, each seed hopper having a slide way in its under face, seed drop slides mounted on said cam shaft and slidable in said slide ways of the hoppers, said cams and slides being connected whereby the slides are reciprocated by the cams on the rotation of the cam shaft, said slides having openings which pass under and beyond the seed hoppers on the reciprocation of the slides whereby the seed are received therein and delivered, a driving connection between the axle and the cam shaft, and means for holding the seed hoppers in raised position, the driving connection between the axle and shaft consisting of a plurality of bearings of different sizes mounted on the driving shaft, a gear on the axle and a chain carried by the axle gear and adapted to be selectively engaged with one of the gears on the drive shaft.

his
LANDON × BATCHELOR.
mark